United States Patent
Chen et al.

(10) Patent No.: US 7,890,593 B2
(45) Date of Patent: Feb. 15, 2011

(54) SECTIONAL E-MAIL TRANSMISSION

(75) Inventors: Yen-Fu Chen, Austin, TX (US); John Hans Handy-Bosma, Cedar Park, TX (US); Mei Yang Selvage, Austin, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 12/175,280

(22) Filed: Jul. 17, 2008

(65) Prior Publication Data

US 2010/0017481 A1    Jan. 21, 2010

(51) Int. Cl.
  *G06F 15/16* (2006.01)
(52) U.S. Cl. .................. 709/206; 709/207; 709/246
(58) Field of Classification Search ......... 709/206–207, 709/246
  See application file for complete search history.

(56) References Cited

U.S. PATENT DOCUMENTS

| | | | |
|---|---|---|---|
| 5,694,616 A | 12/1997 | Johnson et al. | |
| 5,754,778 A | 5/1998 | Shoujima | |
| 6,074,772 A | 6/2000 | Hofer et al. | |
| 6,118,856 A | 9/2000 | Paarsmarkt et al. | 379/93.24 |
| 6,182,059 B1 | 1/2001 | Angotti et al. | |
| 6,192,396 B1 | 2/2001 | Kohler | |
| 6,205,471 B1 | 3/2001 | Gilchrist | |
| 6,247,045 B1 * | 6/2001 | Shaw et al. | 709/207 |
| 6,324,569 B1 | 11/2001 | Ogilvie et al. | 709/206 |
| 6,370,567 B1 | 4/2002 | Ouchi | |
| 6,415,290 B1 | 7/2002 | Botts et al. | |
| 6,427,076 B2 | 7/2002 | Skog | |
| 6,446,118 B1 | 9/2002 | Gottlieb | 709/217 |
| 6,480,711 B1 | 11/2002 | Guedalia | |
| 6,484,196 B1 | 11/2002 | Maurille | |
| 6,529,942 B1 * | 3/2003 | Gilbert | 709/206 |
| 6,563,913 B1 | 5/2003 | Kaghazian | |
| 6,615,241 B1 | 9/2003 | Miller et al. | |
| 6,668,325 B1 | 12/2003 | Collberg et al. | 713/194 |

(Continued)

OTHER PUBLICATIONS

"Selective Receipt of Document Elements in an Electronic Mail System", International Business Machines Corporation, Kenneth Mason Publications Ltd., Jan. 2000, p. 1.

(Continued)

*Primary Examiner*—Wing F Chan
*Assistant Examiner*—Benjamin M Thieu
(74) *Attorney, Agent, or Firm*—Yee & Associates, P.C.; William H. Steinberg; Rudolf O. Siegesmund (57) ABSTRACT

A process of segmenting a single email so that portions of it may be directed to or away from select recipients is disclosed. The sender highlights portions of the email and right clicks (or key command, button, or menu item) and selects an option to select recipients. The operator interface then provides the sender with the option of selecting recipients from their address book or the server's address book. To speed the process along, the sender may select those already on the To, Cc, or Bcc distribution lists. The sender then selects whether those chosen will receive the highlighted portion or if they will be excluded from receiving it. Lastly, the sender will have the option of providing text that is unique to each of the selected groups.

15 Claims, 4 Drawing Sheets

U.S. PATENT DOCUMENTS

| | | |
|---|---|---|
| 6,704,772 B1 | 3/2004 | Ahmed et al. |
| 6,705,381 B2 | 3/2004 | Huang |
| 6,721,785 B1 | 4/2004 | Raghunandan |
| 6,775,689 B1 * | 8/2004 | Raghunandan ............ 709/206 |
| 6,789,107 B1 | 9/2004 | Bates et al. |
| 6,802,067 B1 | 10/2004 | Camp et al. |
| 6,816,868 B1 | 11/2004 | Shimizu |
| 6,826,596 B1 | 11/2004 | Suzuki |
| 6,970,907 B1 | 11/2005 | Ullman et al. |
| 7,039,678 B1 | 5/2006 | Halahmi et al. |
| 7,062,536 B2 | 6/2006 | Fellenstein et al. |
| 7,103,634 B1 | 9/2006 | Ullman et al. |
| 7,111,046 B2 | 9/2006 | Watanabe et al. |
| 7,130,887 B2 | 10/2006 | Goldberg |
| 7,136,897 B1 | 11/2006 | Raghunandan |
| 7,305,381 B1 | 12/2007 | Poppink et al. |
| 7,328,241 B2 | 2/2008 | Ribak et al. |
| 2002/0019827 A1 | 2/2002 | Shiman et al. |
| 2002/0029247 A1 | 3/2002 | Kawamoto |
| 2002/0046250 A1 | 4/2002 | Nassiri |
| 2002/0107930 A1 | 8/2002 | Itoh |
| 2002/0120702 A1 | 8/2002 | Schiavone et al. |
| 2003/0014490 A1 | 1/2003 | Bates et al. |
| 2003/0018731 A1 | 1/2003 | Watanabe et al. |
| 2003/0061111 A1 | 3/2003 | Dutta et al. |
| 2003/0093483 A1 | 5/2003 | Allen et al. |
| 2003/0097414 A1 | 5/2003 | Cabello |
| 2003/0115271 A1 | 6/2003 | Weissman |
| 2003/0195933 A1 | 10/2003 | Curren et al. |
| 2004/0260756 A1 | 12/2004 | Forstall et al. |
| 2005/0021637 A1 | 1/2005 | Cox |
| 2005/0039048 A1 | 2/2005 | Tosey |
| 2005/0080853 A1 | 4/2005 | Kelley et al. |
| 2005/0108351 A1 | 5/2005 | Naick et al. |
| 2005/0267944 A1 | 12/2005 | Little |
| 2005/0289113 A1 | 12/2005 | Bookstaff |
| 2006/0020668 A1 | 1/2006 | Chen et al. |
| 2006/0041624 A1 | 2/2006 | Lyle et al. |
| 2006/0168044 A1 | 7/2006 | Chen et al. |
| 2007/0110103 A1 | 5/2007 | Zimmerman et al. |
| 2008/0281823 A1 | 11/2008 | Chen et al. |

OTHER PUBLICATIONS

USPTO Final Office Action for U.S. Appl. No. 10/897,230 dated Jul. 9, 2009.

USPTO Office Action for U.S. Appl. No. 10/897,230 dated Dec. 8, 2008.

USPTO Final Office Action for U.S. Appl. No. 10/897,230 dated Jul. 2, 2008.

USPTO Final Office Action for U.S. Appl. No. 11/032,850 dated Dec. 1, 2008.

USPTO Office Action for U.S. Appl. No. 11/032,850 dated May 13, 2008.

USPTO office action for U.S. Appl. No. 10/922,249 dated Apr. 17, 2008.

USPTO final office action for U.S. Appl. No. 10/922,249 dated Sep. 17, 2008.

USPTO final office action for U.S. Appl. No. 10/922,249 dated Dec. 11, 2008.

USPTO notice of allowance for U.S. Appl. No. 10/922,249 dated Jun. 2, 2009.

USPTO notice of allowance for U.S. Appl. No. 11/032,850 dated Apr. 17, 2009.

* cited by examiner

SECTIONAL E-MAIL TRANSMISSION

CROSS-REFERENCE TO RELATED APPLICATION

This application is related to co-pending U.S. utility patent application entitled "System And Method for Sectional E-Mail Transmission" filed on Aug. 19, 2004 and accorded Ser. No. 10/922,249, which is entirely incorporated herein by reference.

FIELD OF THE INVENTION

This invention is related to the field of electrical computers and digital processing systems to transfer data via one or more communications media in general, and specifically, to a demand-based messaging system for simultaneous transmission of sections of an email to different recipients without the need to send separate emails.

BACKGROUND OF THE INVENTION

A demand-based messaging system is any communication system that enables a person to exchange electronic messages with another person over a communications media. Demand-based messaging systems typically comprise a network of data processing machines and a messaging program operable on at least one machine to transfer electronic messages over the network to one or more of the other machines. Electronic messages typically are composed of a variety of information, including message data and transmission data. As those terms are used here, "message data" generally refers to the substance of the message, such as text or images, while "transmission data" generally refers to the information required to deliver or respond to the message, such as the correspondents' electronic addresses. Electronic messages also may include status information, such as the time and date that the message was composed, sent, or received.

LOTUS NOTES, MOZILLA, and MICROSOFT OUTLOOK are exemplary messaging programs that enable users to exchange electronic mail messages through networked computers. Instant messaging ("IM") programs such as MSN MESSENGER and YAHOO! MESSENGER, which have gained popularity in recent years, exemplify another embodiment of messaging programs that enable users to exchange electronic messages in real-time through networked computers.

Electronic mail messages are often sent to a group of recipients. Such recipients fall into three categories: the addressee, the copied recipient, and the recipient who receives a blind copy. The addressee receives the message and sees who has been copied. The recipient who has been copied receives the message and knows to whom the message was directed. The recipient who receives a blind copy receives the message, knows to whom the message was directed and who received copies, but the addressee and the copied recipients do not know the identity of the blind copy recipient.

An originator may want to send a bulk message to all recipients, but a small section unique to each individual recipient. For example, a user may send instructions to coordinate an event, with a unique time assignment to each recipient who receives the email. Sometimes a need arises to vary the message sent to one or more recipients. A sender of an email may not want its entire contents to go to all recipients. Normally, the sender would have to break up the email and send it in segments. Having to send multiple emails wastes the sender's time as well as wastes disk space on the server and bandwidth on the network.

An originator may desire to send an email where only a portion is intended for all recipients, another portion only for select recipients, and a final portion that is not to be sent to certain other recipients. Perhaps the material sent to the select recipients is confidential. The material not to be sent to some recipients may be attachments that are already available to them on their server.

An originator may desire to send an email containing a section of text that is of common interest to all the recipients followed by text that is specific to each recipient. Perhaps the specific text is the recipient's new password. The desire is to send the specific text only to the intended recipient. The common text would go to all recipients.

The need to vary the message can arise with a group of recipients in one status grouping or in more than one status grouping. For example, the sender may want to provide additional information for a recipient who is less familiar with the context of the message than other recipients. Likewise, a user may want to send special instructions to a recipient such as a reminder to a blind copy recipient not to reply because the user does not want the other recipients to know he included the blind copy recipient. Presently, varying message text requires sending separate messages.

Sending separate messages requires time to create the separate electronic messages and to copy and paste the content of the separate messages. Since the messages are sent separately, some of the reply messages will not go to all of the recipients. In particular, reply messages will not go to all recipients when the reply comes from a message sent only to a subset of the overall group of recipients. In order to solve this problem, the sender could include the subset of recipients on both emails. In that event, the subset of recipients receives redundant emails. Sending multiple electronic messages consumes more network bandwidth and storage space. Increased consumption of network bandwidth and storage space increases costs. Costs further increase when the email is large or has large attachments. If an originator of an email had an easy way to segment a single email, the originator would save time as well as network disk storage space and bandwidth. Therefore, a need exits for an improved electronic messaging system that allows transmission of e-mail segments to different recipients.

U.S. Pat. No. 6,118,856 discloses receiving an email and automatically forwarding it to a remote device. The forwarding is done by an act of the recipient, not the sender. The forwarding may be limited to a selective portion of the original email. This patent is primarily concerned with forwarding received emails to a cell phone or a text pager. The forwarding is based on the content of the message. For example, the forwarding may be done based on a particular sender.

U.S. Pat. No. 6,446,118 discloses a system for receiving email while away from your computer without having to subscribe to a "commercial, public network" such as SkyTel. A portion of the email, such as the header, may be all that is transmitted to an email notification device. Other, limited information, like message size and when the message was originally received, may also be transmitted.

SUMMARY OF THE INVENTION

The invention that meets the needs described above is a process of segmenting a single email so that portions of it may be directed to or away from select recipients. The sender highlights portions of the email and right clicks (or key command, button, or menu item) and selects an option to select recipients. The operator interface then provides the sender with the option of selecting recipients from their address book or the server's address book. To speed the process along, the sender may select those already on the To, Cc, or Bcc distribution lists. The sender then selects whether those chosen will receive the highlighted portion or if they will be excluded from receiving it. Lastly, the sender will have the option of providing text that is unique to each of the selected groups.

These and other objects of the invention will be apparent to those skilled in the art from the following detailed description of a preferred embodiment of the invention.

BRIEF DESCRIPTION OF DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A person of ordinary skill in the art will appreciate that the present invention may be implemented in a variety of software and hardware configurations. It is believed, however, that the invention is described best as a computer program that configures and enables one or more general-purpose computers to implement the novel aspects of the invention.

As used herein, "attachment" means a file that is transmitted with an email that is not part of any messages in the email itself.

As used herein, "blind copy recipient" means a recipient whose identity is not to be disclosed to other recipients of the same message.

As used herein, "computer" means a machine having a processor, a memory, and an operating system, capable of interaction with a user or other computer, and shall include without limitation desktop computers, notebook computers, tablet computers, personal digital assistants (PDAs), servers, handheld computers, and similar devices.

As used herein, "copy recipient" means a recipient for whom a message is not primarily intended but who is included in the distribution list to be kept informed, and may be synonymous with secondary recipient.

As used herein, "electronic mail" or "email" means direct user-to-user transmission of messages between user computers over a network.

As used herein, "electronic messaging" means the creation, transfer, storage, and retrieval of text, graphics, images, or voice data by electronic means.

As used herein, "header" means the portion of a message that contains control information for the message.

As used herein, "recipient" means anyone or any location that receives data, and a user of a demand-based messaging system to whom a message is addressed.

As used herein, "section" means a message or a portion of a message.

As used herein, "message" means an electronic mail message transmitted over a network.

Figures 1, 2:
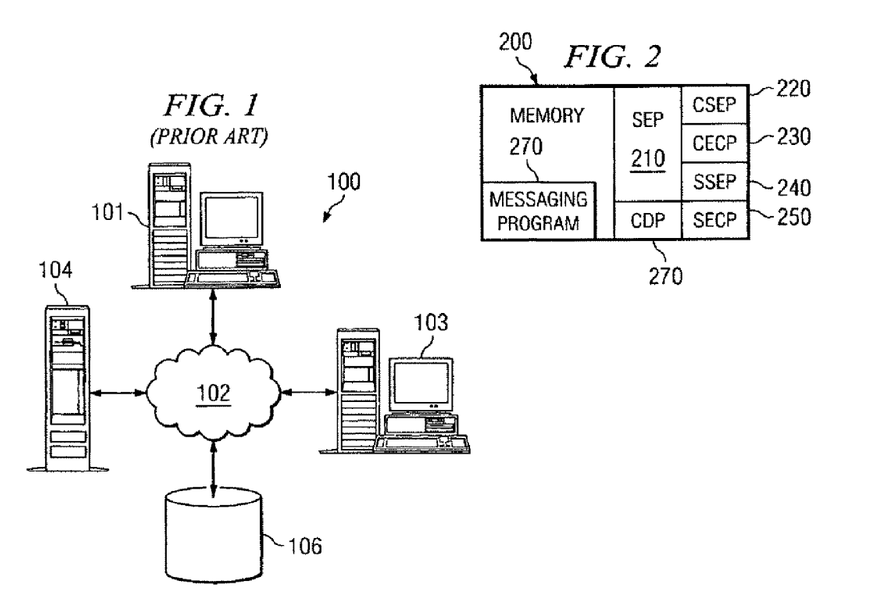
FIG. 1 depicts a computer network in which the invention may be employed.
FIG. 2 depicts a representative computer memory in which the invention may reside.

FIG. 1 illustrates a common prior art architecture for connecting various hardware devices to create a network for transferring data. Computer network 100 comprises local workstation 101 electrically coupled to network connection 102. In FIG. 1, local workstation 101 is coupled electrically to remote workstation 103 via network connection 102. Local workstation 101 also is coupled electrically to server 104 and persistent storage 106 via network connection 102. Network connection 102 may be a simple local area network (LAN) or may be a larger wide area network (WAN), such as the Internet. While computer network 100 depicted in FIG. 1 is intended to represent a possible network architecture, it is not intended to represent an architectural limitation.

The internal configuration of a computer, including connection and orientation of the processor, memory, and input/output devices, is well known in the art. FIG. 2 represents the internal configuration of a computer having the computer program of the present invention loaded into memory 200. The computer program of the present invention is depicted as SEP 210. As will be discussed further below, SEP 210 includes without limitation Client Sectional E-Mail Program (CSEP) 220, Client E-mail Clearance Program (CECP) 230, Server Sectional E-Mail Program (SSEP) 240, Server E-Mail Clearance Program (SECP) 250, and Cursor Display Program (CDP) 270. Memory 200 also has messaging program 270. Memory 200 is only illustrative of memory within a computer and is not meant as a limitation. Memory 200 may reside in a client computer such as local workstation 101 or in a server computer such as server 104.

In alternative embodiments, SEP 210 can be stored in the memory of other computers. Storing SEP 210, in the memory of other computers allows the processor workload to be distributed across a plurality of processors instead of a single processor. Further configurations of SEP 210 across various multiple memories and processors are known by persons skilled in the art.

Figure 3:
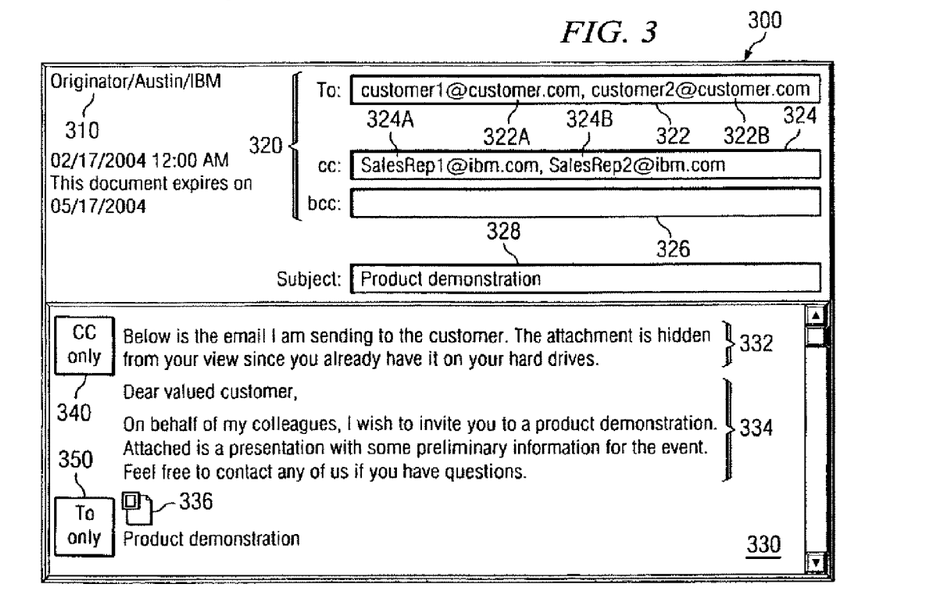
FIG. 3 depicts an example e-mail applying the invention.

FIG. 3 depicts an example e-mail 300. E-mail 300 has originator section 310, addressee section 320, message section 330, first tab 340 and second tab 350. Addressee section 320 has recipient address section 322, copy recipient address section 324, blind copy recipient address section 326 and subject section 328. Message Section 330 has first message section 332, second message section 334, and attachment 336. Recipient address section 322 has first recipient address 322A shown as customer1@customer.com and second recipient address 322B shown as "customer2@customer.com." Copy recipient address section 324 has first copy recipient address 324A shown as SalesRep1@ibm.com and second copy recipient address 324B shown as SalesRep2@ibm.com. Blind copy recipient address section 326 is empty. Subject section 328 shows "Product Demonstration." First message section 332 shows an example message intended for internal use only, "Below is the email I am sending to the customer." First message section 332 also contains information only for the copy recipient addressees explaining to them that they are not receiving the attachment sent to the recipients, "The attachment is hidden from your view since you already have it on your hard drives." Second message section 334 contains information for the recipient addresses regarding an invitation to a product demonstration.

Originator 310 normally would create one email to the customers shown in recipient addressee section 322 and create another email to the copy recipient addressees shown in copy recipient address section 324. However, SEP 210 allows originator 310 to create one email and to sectionalize that one email in the following manner.

Figure 4:
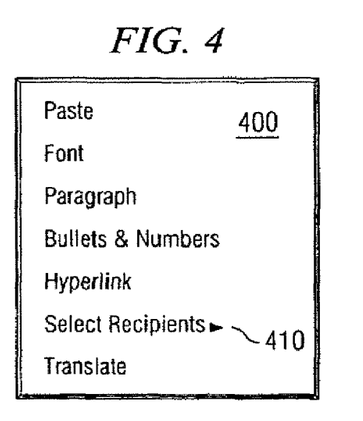
FIG. 4 depicts a dialog box with a select recipients option.

In order to sectionalize the email, originator 310 highlights first message section 332 and, using a mouse, right clicks (or such other means known to person skilled in the art such as a key command button or menu item) to receive a display of options from which the originator selects "select recipients." Upon selecting "select recipients" a dialog box appears asking the originator to identify who will receive the section. Referring to FIG. 4, dialog box 400 has a number of prior art options for selection and a new option appearing in dialog box 400, select participants 410. Upon activating select recipients 410 a further selection window, window 500 appears providing selection options.

Figure 5:
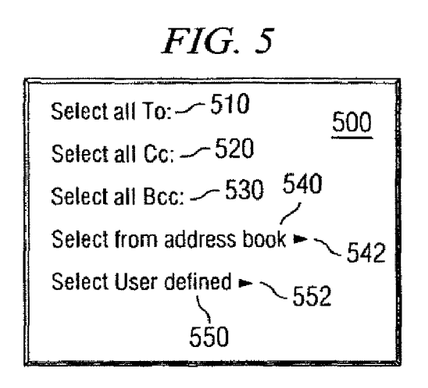
FIG. 5 depicts a window for the select recipients option.

Referring to FIG. 5, window 500 has Select all To 510, Select all Cc 520, Select all Bcc 530, Select from address book 540, and Select User defined 550. Activation of Select All To 510 means that the highlighted portion of the e-mail will only be received by those recipients identified in recipient address section 322. Activation of Select All Cc 520 means that the highlighted portion of the e-mail will only be received by those recipients identified in copy recipient address section 324. Activation of Select All Bcc 530 means that the highlighted portion of the e-mail will only be received by those recipients identified in blind copy recipient section 326.

Alternatively, upon selection of select recipients window 410 from dialog box 400, a list of all recipients in the recipient address section 322, copy recipient address section 324, and blind copy recipient address section 326 may be presented so that the user can select recipients using drag and drop, highlighting, checkboxes, add/remove buttons, and other means known to persons skilled in the art.

Figure 6:
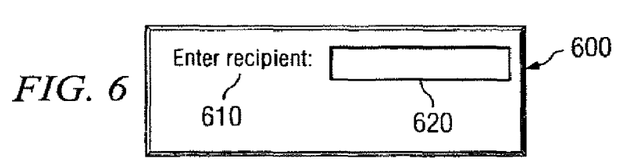
FIG. 6 depicts a window for entering a recipient address.

Activation of Select from Address Book 540 means that originator 310's address book will be displayed so that originator 310 can select addressees to receive the highlighted portion of the e-mail, and those selected will be the only ones that will receive the highlighted portion. SEP 210 may be configured to display the user's local or server address book. In addition, originator 310 may add recipients from the address book to names selected from other options in window 500. Activation of Select User Defined 550 means that an entry field window, such as Enter recipient window 600 will appear. Referring to FIG. 6, enter recipient window 600 has entry field 620 for originator 310 to enter a recipient email address. Persons skilled in the art will be aware of multiple ways in which information may be presented, and multiple ways in which selections may be made by originator 310.

Figure 7:
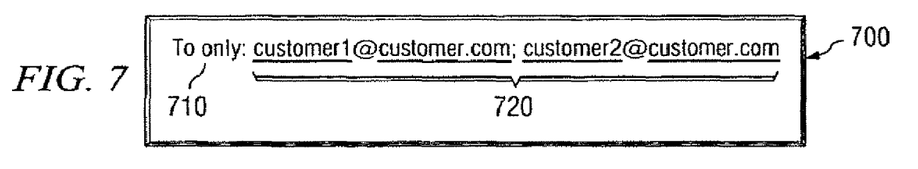
FIG. 7 depicts recipient display.
Figure 8:
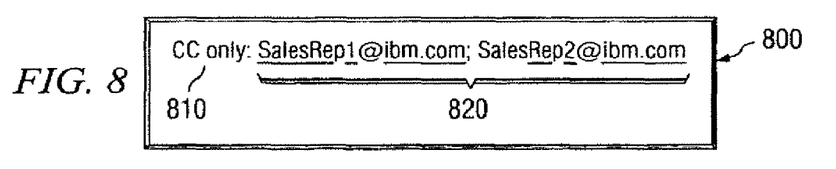
FIG. 8 depicts a copy recipient display.

Once originator 310 makes selections, the email appears in its entirety to originator 310, but the recipients will only receive and be able to read those portions designated for them to receive and read. Originator 310 may review the e-mail by passing the cursor over the various portions of the email. For example, passing the cursor over second section 334, causes second recipient window 700 (see FIG. 7) to appear displaying the recipients designated to receive second section 334. Likewise, passing the cursor over first section 332 causes a window to appear, such as copy recipient window 800 (see FIG. 8), displaying the recipients designated for first section 332.

Figure 9:
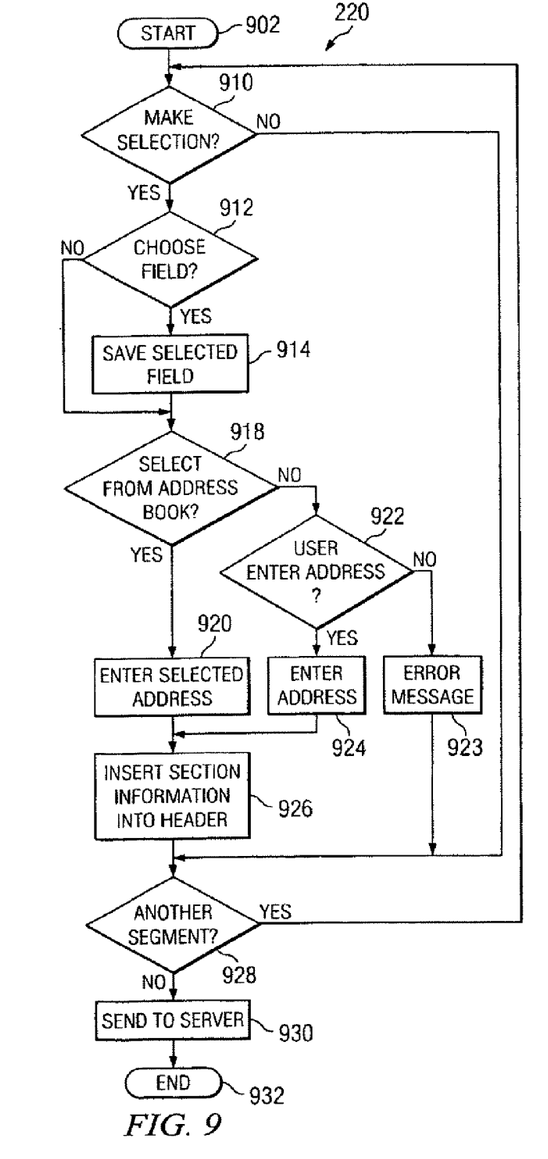
FIG. 9 depicts a flow chart of the Client Sectional E-Mail Program.

FIG. 9 depicts a flow chart for the CSEP 220. CSEP 220 begins and determines whether originator 310 has made a selection (910). If not, CSEP 220 goes to step 928. If originator 310 made a selection, then a determination is made whether originator 310 chose a field (912). If originator 310 chose a field, then the selected field is saved (914) and CSEP 220 goes to step 918. If not, CSEP 220 determines whether originator 310 wants to choose an address from an address book (918). If so, CSEP 220 saves the address selected by the user (920) and goes to step 926. If not, CSEP 220 determines whether the user wants to enter an address (922). If so, CSEP 220 enters the address (924) and goes to step 926. If not, an error message is displayed (923) and CSEP 220 goes to step 928. At step 926, CSEP 220 inserts section information into the email header (926). The section information embedded in the email header designates the section by starting and ending character. By designating starting and ending characters, the originator can specify sections by word, phrase, sentence or paragraph. In other words, the originator can specify sections with total granularity. The originator may have the option to prefix the selected sections with explanatory text to inform the recipients that the section is being transmitted only to them. Moreover, standard explanatory text may be automatically inserted with a section that has been designated for specific recipients. The preferred implementation of such optional text would be hypertext markup language (HTML) formatting with indenting and coloring capability. A determination is made whether there is another segment (928). If so, CSEP 220 goes to step 910. If not, CSEP 220 sends the email to the server (930) and stops (940).

Figure 10:
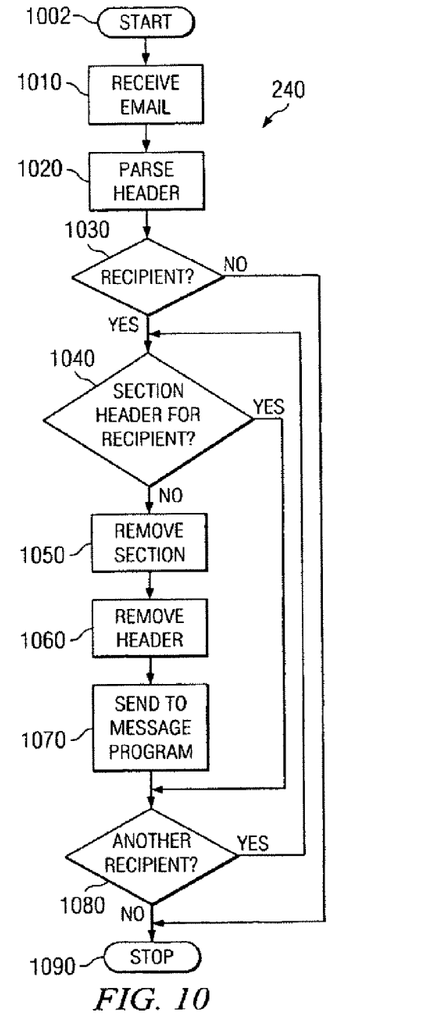
FIG. 10 depicts a flow chart of the Server Sectional E-Mail Program.

FIG. 10 depicts a flow chart of Server Sectional Email Program (SSEP) 240. SSEP 240 begins, and receives an email (1010). SSEP 240 parses the header of the email (1020) and determines whether recipient is designated (1030). If not, SSEP 240 stops (1090). If so, SSEP 240 determines whether there is a section header for the recipient (1040). If so, SSEP 240 goes to step 1080. If not, SSEP 240 removes the section (1050), removes the header (1060) and sends the email to the messaging program (1070). In other words, SSEP 240 sends to the recipient only the text and/or attachments of the section that have been specified for that recipient. Correspondingly, SSEP 240 strips from the email the text and attachments of the section for those who are not specified to receive the section. When stripping text and attachments for those message recipients that are not to receive the section, SSEP 240 also removes the header information so that the recipient cannot see that there were sections the recipient did not receive. However, for sections the recipient does receive, the email retains the header which provides additional functionality as described in FIG. 13. SSEP 240 determines whether there is another recipient (1080). If so, SSEP 240 goes to step 1040. If not, SSEP 240 stops (1090).

Since CSEP 220 sends the email to the server with instructions on segmenting the email, and SSEP 240 then segments the email according to the instructions in the header and sends the separate emails to the respective recipients, network bandwidth and storage are conserved.

Figure 11:
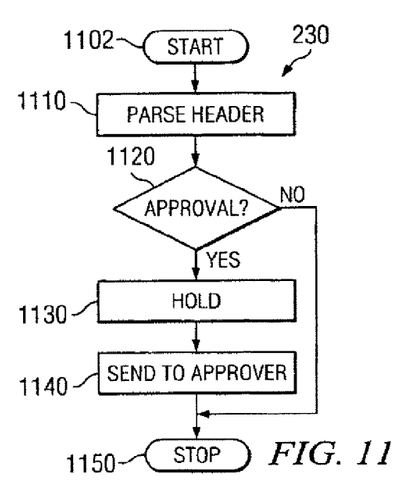
FIG. 11 depicts a flow chart of the Client E-mail Clearance Program.

FIG. 11 depicts a flow chart of Client E-mail Clearance Program (CECP) 230. CECP 230 starts (1102) and parses the header of an email (1110). CECP 230 determines whether approval is required (1120). If not, CECP 230 stops (1150). If so, CECP 230 holds the email (1130), sends the email to an approver (1140) and stops (1150). Persons skilled in the art are aware that CECP 230 may be enabled or disabled. Furthermore, CECP 230 may be configured so that a criteria is established for determining which emails require approval. Approval criteria may include emails to a certain domain, such as a customer's domain, time, location, keywords, recipients, or any other criteria that would support management functions.

Figure 12:
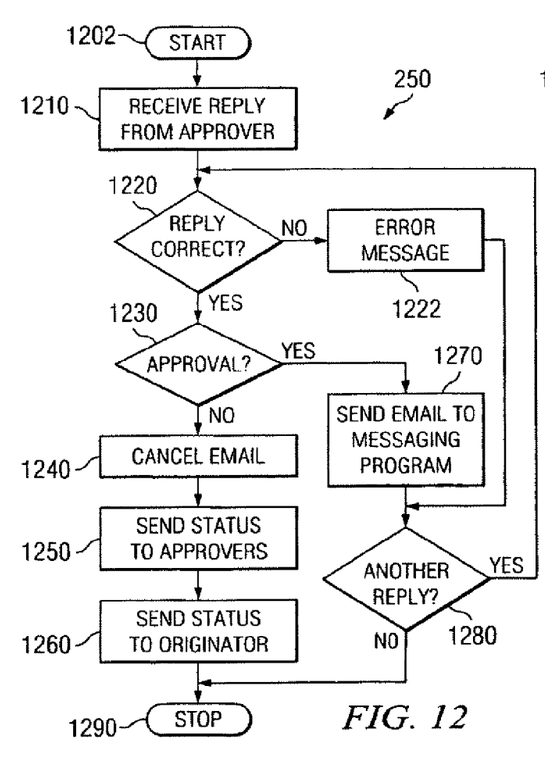
FIG. 12 depicts a flow chart of the Server E-Mail Clearance Program.

FIG. 12 depicts a flow chart of Server E-mail Clearance Program (SECP)250. SECP 250 starts (1202) and receives a reply from the approver (1210). SECP 250 determines whether the reply is correct (1220). If the reply is not correct, an error message is displayed, and SECP 250 goes to step 1280. If the reply is correct, SECP 250 determines whether approval has been granted (1230). If not, SECP 250 cancels the email (1240), sends a status to the approver (1250), sends a status to the originator (1260), and stops (1290). If so, SECP 250 sends the email to the messaging program (1270). SECP 250 then determines whether there is another reply (1280). If so, SECP 250 goes to step 1220. If not, SECP 250 stops (1290). Persons skilled in the art are aware of multiple methods by which the approver may reply. For example, approval may consist of a reply from the approver, or an action such as changing the subject to "Approve" or "Yes." Likewise, denial can be controlled by changing the subject to "Deny" or "No" along with optional comments in the body of the email.

Figure 13:
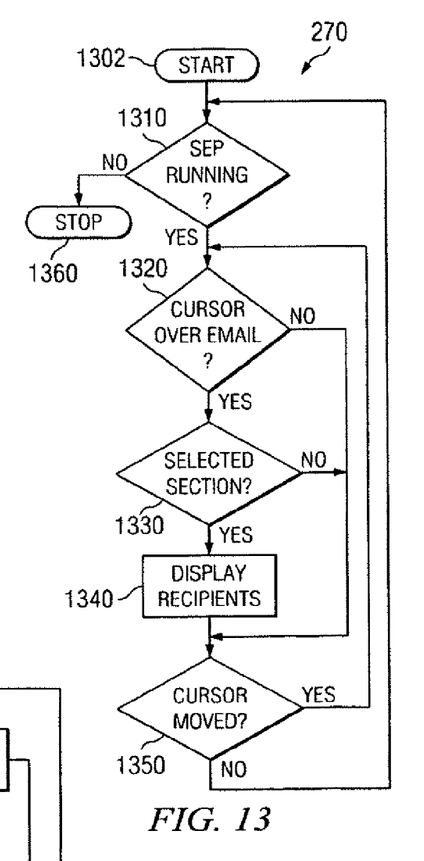
FIG. 13 depicts a flow chart of the Cursor Display Program.

Once section information has been inserted into the header of the email, a user may hover the mouse over a given section of email and obtain information regarding who received or did not receive that section. FIG. 13 depicts a flow chart of the Cursor Display Program CDP 270. CEP 270 starts (1302) and determines whether SEP is running (1310). If not, CDP 270 stops. If so, CDP 270 determines whether the user has placed a cursor over the email (1320). If not, CDP 270 goes to step 1350. If so, CDP 270 determines whether the cursor is over a selected section (1330). If not, CDP 270 goes to step 1350. If so, CDP 270 displays the recipients for the selected section (1340). At step 1350, CDP 270 determines whether the cursor has moved (1350). If so, CDP 270 goes to step 1320. If not, CDP goes to step 1310.

In an additional embodiment, SEP 210 may he configured to block a recipient from replying or forwarding an email that was sent only to that recipient. Such an embodiment may prevent accidental disclosure of information intended only for specified recipients.

In an alternate embodiment, SEP 210 may be employed only in the client computer. In such an embodiment, the client computer segments the email and sends separate emails as provided by the originator. Such an embodiment does not save bandwidth and disk storage space, but it does save the originator's time by automatically preparing the separate messages. In addition, such an embodiment allows for a pure client implementation, at reduced functionality, without requiring a server implementation.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer program product for segmenting an email addressed to a plurality of original email recipients without the need to send separate emails, the computer program product comprising:
  a computer readable storage device;
  first program instructions for selecting a section of the email;
  second program instructions for selecting a recipient for the section from the plurality of recipients;
  third program instructions for inserting, responsive to selecting the recipient for the section, a section information that identifies the recipient for the section and a starting and an ending character of the section into a header of the email;
  fourth program instructions for sending the email to an email server, the email server comprising a processor and a memory;
  fifth program instructions for receiving the email at the email server;
  sixth program instructions for parsing, at the email server, the header for the section information;
  seventh program instructions for sending, at the email server, the email to the recipient for the section; and
  eighth program instructions for sending, at the email server, the email without the section and the section information to the plurality of original recipients that have not been selected for receiving the section so that the plurality of original recipients cannot see that the section was removed;
  wherein the first through the eighth program instructions are stored in the computer readable storage device; and
  wherein the section information is adapted to automatically prefix the section with an explanatory text to inform the section recipient that the section is being transmitted only to the section recipient, and wherein the explanatory text is adapted to be indented and colored.

2. The computer program product of claim 1 further comprising:
  ninth program instructions for displaying, responsive to passing a cursor over the selected section of the email, a window showing a recipient of the selected section;
  wherein the ninth program instructions are stored in the computer readable storage device.

3. The computer program product of claim 1, wherein selecting a section of the email is responsive to a user highlighting a portion of the email and right clicking on the highlighted portion.

4. The computer program product of claim 1 further comprising:
  tenth program instructions for displaying, responsive to selecting the section of the email, a window having the plurality of recipients for identifying the section recipient of the section;
  wherein the tenth program instructions are stored in the computer readable storage device.

5. The computer program product of claim 1, wherein the starting character and the ending character are adapted to designate a word, a phrase, a sentence, or a paragraph.

6. A computer implemented method for segmenting an email addressed to a plurality of original email recipients without the need to send separate emails comprising:
  selecting a section of the email;
  selecting a recipient for the section from the plurality of recipients;
  responsive to selecting the recipient for the section, inserting a section information that identifies the recipient for the section and a starting and an ending character of the section into a header of the email;
  sending the email to an email server, the email server comprising a processor and a memory;
  at the email server, performing steps including:
    receiving the email;
    parsing the header for the section information;
    sending the email to the recipient for the section;

sending the email without the section and the section information to the plurality of original recipients that have not been selected for receiving the section so that the plurality of original recipients cannot see that the section was removed;

wherein the section information is adapted to automatically prefix the section with an explanatory text to inform the section recipient that the section is being transmitted only to the section recipient, and wherein the explanatory text is adapted to be indented and colored.

7. The computer implemented method of claim 6 further including responsive to passing a cursor over the selected section of the email, displaying a window showing a recipient of the selected section.

8. The computer implemented method of claim 6, wherein selecting a section of the email is responsive to a user highlighting a portion of the email and right clicking on the highlighted portion.

9. The computer implemented method of claim 6 further including responsive to selecting the section of the email, displaying a window having the plurality of recipients for identifying the section recipient of the section.

10. The computer implemented method of claim 6, wherein the starting character and the ending character are adapted to designate a word, a phrase, a sentence, or a paragraph.

11. A data processing system comprising:

a bus;

a communications unit connected to the bus;

a computer readable storage device connected to the bus;

a processor unit connected to the bus and to a computer readable memory;

first program instructions for selecting a section of the email;

second program instructions for selecting a recipient for the section from the plurality of recipients;

third program instructions for responsive to selecting the recipient for the section, inserting a section information that identifies the recipient for the section and a starting and an ending character of the section into a header of the email;

fourth program instructions for sending the email to an email server, the email server comprising a processor and a memory;

fifth program instructions for receiving the email at the email server;

sixth program instructions for parsing, at the email server, the header for the section information;

seventh program instructions for sending, at the email server, the email to the recipient for the section; and eighth program instructions for sending, at the email server, the email without the section and the section information to the plurality of original recipients that have not been selected for receiving the section so that the plurality of original recipients cannot see that the section was removed;

wherein the first through the eighth program instructions are stored in the computer readable storage device for running via the computer readable memory; and wherein the section information is adapted to automatically prefix the section with an explanatory text to inform the section recipient that the section is being transmitted only to the section recipient, and wherein the explanatory text is adapted to be indented and colored.

12. The data processing system of claim 11 further comprising:

ninth program instructions for displaying, responsive to passing a cursor over the selected section of the email, a window showing a recipient of the selected section;

wherein the ninth program instructions are stored in the computer readable storage device for running via the computer readable memory.

13. The data processing system of claim 11, wherein selecting a section of the email is responsive to a user highlighting a portion of the email and right clicking on the highlighted portion.

14. The data processing system of claim 11 further comprising:

tenth program instructions for displaying, responsive to selecting the section of the email, a window having the plurality of recipients for identifying the section recipient of the section wherein the tenth program instructions are stored in the computer readable storage device for running via the computer readable memory.

15. The data processing system of claim 11, wherein the starting character and the ending character are adapted to designate a word, a phrase, a sentence, or a paragraph.

* * * * *